US012563455B2

(12) United States Patent
Fang et al.

(10) Patent No.: US 12,563,455 B2
(45) Date of Patent: Feb. 24, 2026

(54) SYSTEM AND METHODS OF NETWORK PERFORMANCE OPTIMIZATION

(71) Applicant: ZTE Corporation, Guangdong (CN)

(72) Inventors: Jianmin Fang, Guangdong (CN); Zhihong Qiu, Guangdong (CN); He Huang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 275 days.

(21) Appl. No.: 18/136,852

(22) Filed: Apr. 19, 2023

(65) Prior Publication Data

US 2024/0015610 A1 Jan. 11, 2024

Related U.S. Application Data

(63) Continuation of application No. PCT/CN2020/122475, filed on Oct. 21, 2020.

(51) Int. Cl.
*H04W 36/00* (2009.01)
*H04W 24/02* (2009.01)
*H04W 36/36* (2009.01)
(52) U.S. Cl.
CPC ....... *H04W 36/0061* (2013.01); *H04W 24/02* (2013.01); *H04W 36/0058* (2018.08); *H04W 36/362* (2023.05)
(58) Field of Classification Search
CPC ......... H04W 36/0061; H04W 36/0058; H04W 36/362; H04W 24/02
See application file for complete search history.

(56) References Cited

FOREIGN PATENT DOCUMENTS

| WO | 2013169169 A2 | 11/2013 | |
| WO | 2020/167237 A1 | 8/2020 | |
| WO | WO-2022051900 A1 * | 3/2022 | ............ H04W 24/02 |
| WO | WO-2022269567 A1 * | 12/2022 | ........... H04W 24/08 |
| WO | WO-2023075657 A1 * | 5/2023 | ........ H04W 36/0058 |

OTHER PUBLICATIONS

International Search Report and Written Opinion for International Application No. PCT/CN2020/122475, mailed on Jul. 21, 2021, 9 pages.
CATT (Rapporteur), "Output of Email Discussion [107#45][NRSON] RACH and Mobility Robustness Optimisation Checking," 3GPP TSG-RAN WG2 Meeting #107bis, Chongqing, P.R. China, R2-1912147, Oct. 14-18, 2019, 38 pages.
CATT, "Discussion on MRO for DAPS mobility enhance," 3GPP TSG-RAN WG3 #109-e, E-Meeting, R3-205126, Aug. 17-27, 2020, 3 pages.

(Continued)

*Primary Examiner* — Erika A Washington
(74) *Attorney, Agent, or Firm* — Perkins Coie LLP

(57) ABSTRACT

A method for wireless communications comprising: transmitting, by a network node to a wireless device, a handover configuration information to facilitate reporting of successful handovers associated with the wireless device; receiving, at the network node, information reporting a successful handover associated with the wireless device, wherein the information reporting the successful handover is in accordance with the handover configuration information; and performing network optimization based on the information reporting the successful handover.

19 Claims, 12 Drawing Sheets

(56)         References Cited

OTHER PUBLICATIONS

Ericsson, "On the Use Case of RLF Related Information upon a Successful Handover," 3GPP TSG-RAN WG3 #105bis, Chongqing, China, R3-196058, Oct. 14-18, 2019, 5 pages.
Huawei, "Successful Handovers Reports," 3GPP TSG-RAN3 Meeting #109-e, E-Meeting, R3-204935, Aug. 17-28, 2020, 3 pages.
CATT, "Further Considerations on CP of DAPS-RUDI," 3GPP TSG RAN WG2 Meeting #107bis, Chongqing, P.R. China, R2-1912131, Oct. 14-18, 2019, 3 pages.
EPO, Extended European Search Report for European Application No. 20 958 088.5, mailed on May 3, 2024, 14 pages.
IP Australia, Exam Report for Australian Application No. 2020472959, mailed on May 31, 2024, 3 pages.
EPO, Communication pursuant to Article 94(3) EPC for European Application No. 20 958 088.5, mailed on Feb. 7, 2025, 14 pages.

IP Australia, Notice of Acceptance for Australian Application No. 2020472959, mailed on Feb. 11, 2025, 3 pages.
3GPP Standard, 3rd Generation Partnership Project; 1-15 Technical Specification Group Radio Access Network; Study on RAN-centric data collection and utilization for LTE and NR (Release 16), 3GPP TR 37.816, 3rd Generation Partnership Project, V.16.0.0, Jul. 2019, 1-35.
Ericsson, "Successful handover report in NR," 3GPP TSG RAN WG2 #108, Reno, USA, R2-1915435, Nov. 18-Dec. 22, 2019, 18 pages.
Samsung, "Discussion for Successful Handover Report," 3GPP TSG RAN3 #109-e, E-Meeting, R3-205423, Aug. 17-28, 2020, 4 pages.
Ericsson, "SON Scope and Requirements for Rel.17," 3GPP TSG RAN WG2 #111e, Electronic meeting, R2-2007661, Aug. 17-28, 2020, 10 pages.

* cited by examiner

1000

1002 receiving, at a network node, information reporting a handover failure associated with a wireless device, wherein the information reporting the handover failure comprises failure information

1004 performing network optimization based on the information reporting the handover failure

SYSTEM AND METHODS OF NETWORK PERFORMANCE OPTIMIZATION

CROSS-REFERENCE TO RELATED APPLICATIONS

This application is a continuation of International Patent Application No. PCT/CN2020/122475, filed on Oct. 21, 2020, the contents of which are incorporated herein by reference in their entirety.

TECHNICAL FIELD

This patent document is directed generally to wireless communications.

BACKGROUND

With the introduction of 5G high frequency bands, the radius of cells has become smaller, and as a result, handovers (HOs) occurs more frequently. This can cause valuable random access (RA) resources of a network to be strained and challenge network performance optimization of the RA resources. Accordingly, there is a need to optimize performance of the network and the user equipment (UE) so that handovers can be more effective.

SUMMARY

In one exemplary embodiment, a method for wireless communications includes transmitting, by a network node to a wireless device, a handover configuration information to facilitate reporting of successful handovers associated with the wireless device; receiving, at the network node, information reporting a successful handover associated with the wireless device, wherein the information reporting the successful handover is in accordance with the handover configuration information; and performing network optimization based on the information reporting the successful handover.

In one exemplary embodiment, a method for wireless communications includes receiving, at a network node, information reporting a handover failure associated with a wireless device, wherein the information reporting the handover failure comprises failure information; and performing network optimization based on the information reporting the handover failure.

DETAILED DESCRIPTION

Section headings are used in the present document only for ease of understanding and do not limit the scope of the embodiments to the section in which they are described. Furthermore, while embodiments are described with reference to 5G examples, the disclosed techniques may be applied to wireless systems that use protocols other than 5G or 3GPP protocols.

The development of the new generation of wireless communication—5G New Radio (NR) communication—is part of a continuous mobile broadband evolution process to meet the requirements of increasing network demand NR will provide greater throughput to allow more users to be connected at the same time. Other aspects, such as energy consumption, device cost, spectral efficiency, and latency are also important to meeting the needs of various communication scenarios.

Overview

Figure 1A:
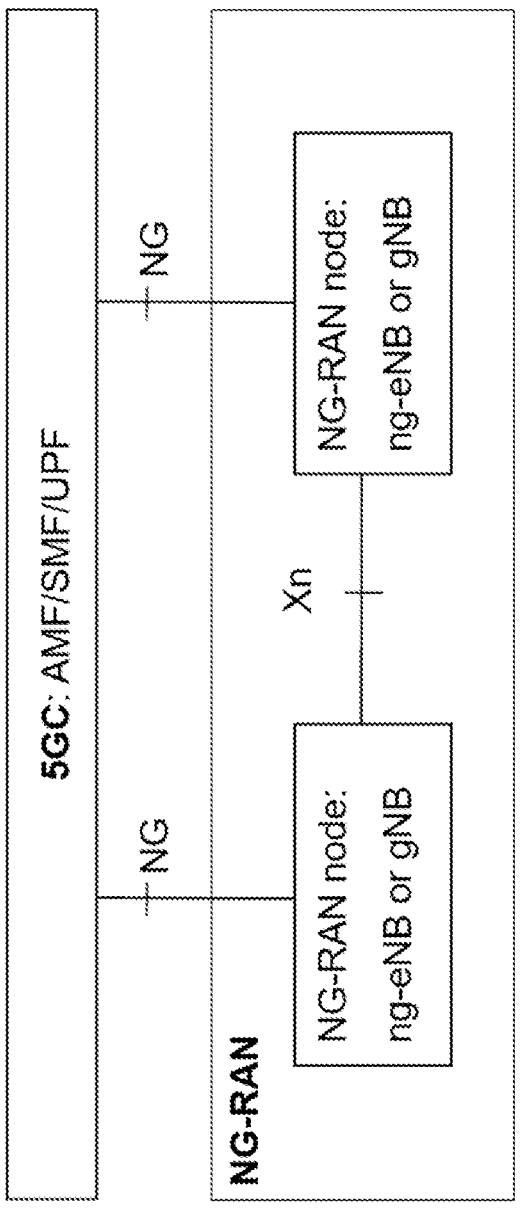
FIG. 1A illustrates an example 5G network architecture.

FIG. 1A illustrates an example 5G network architecture. For example, a 5G network architecture may include a 5G Core network (5GC) and a next generation radio access network (NG-RAN). The 5GC may include any of an Access Mobility Function (AMF), a Session Management Function (SMF), and a User Plane Function (UPF). The NG-RAN may include base stations with different radio access technologies (RATs), such as an evolved 4G base station (ng-eNB) and a 5G base station (gNB). The NG-RAN base station may be connected to the 5GC through the NG interface, and the NG-RAN base station may be connected through the Xn interface. A RAN node can be a gNB providing New Radio (NR) user plane and control plane services. As another example, a RAN node can be an enhanced 4G eNodeB that connects to the 5G Core network via the NG interfaces but still uses 4G LTE air interface(s) to communicate with the 5G UE/wireless device.

Figure 1C:
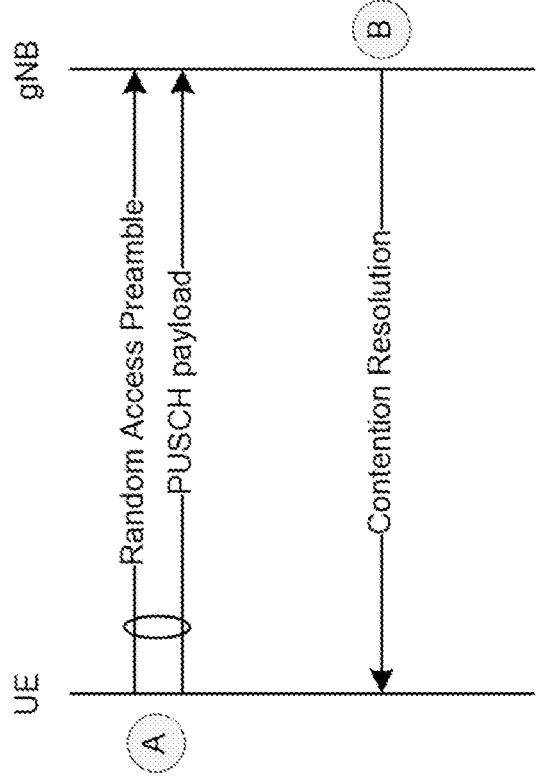
FIG. 1B to FIG. 1E show examples of various random access (RA) procedures.
Figure 1B:
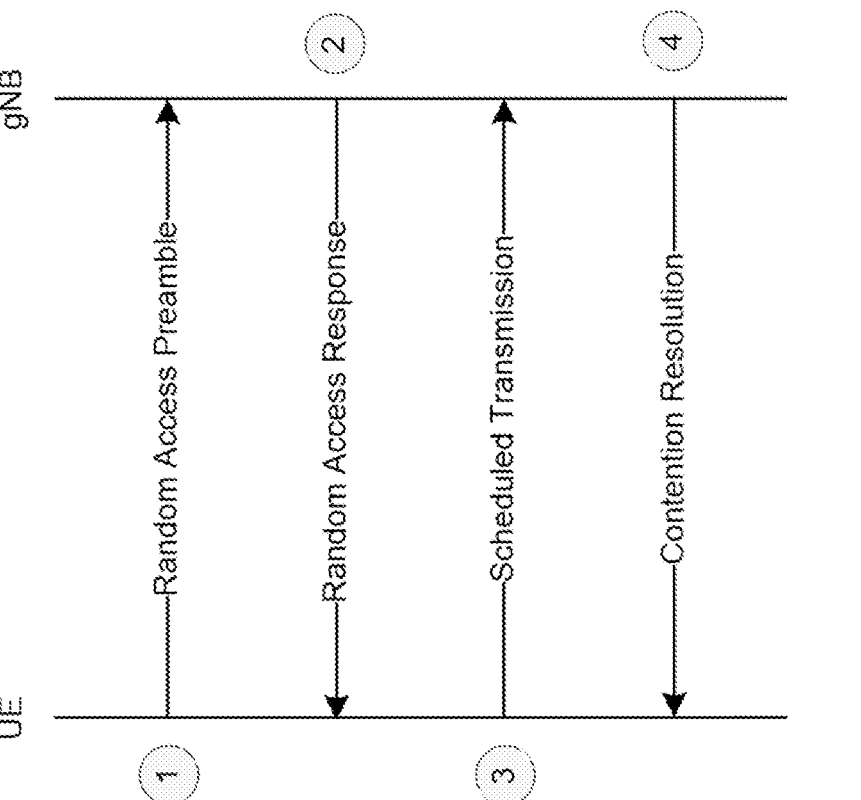
Figure 1E:
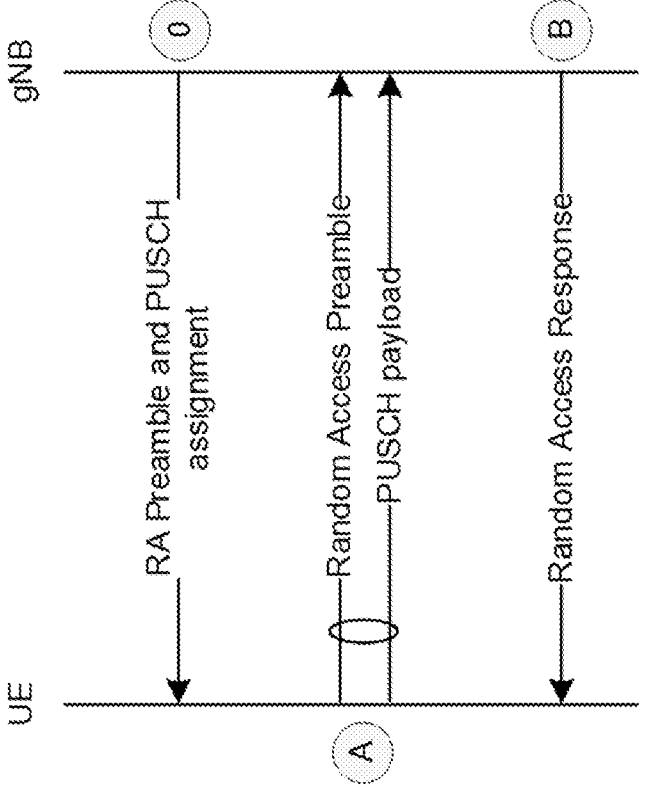
Figure 1D:
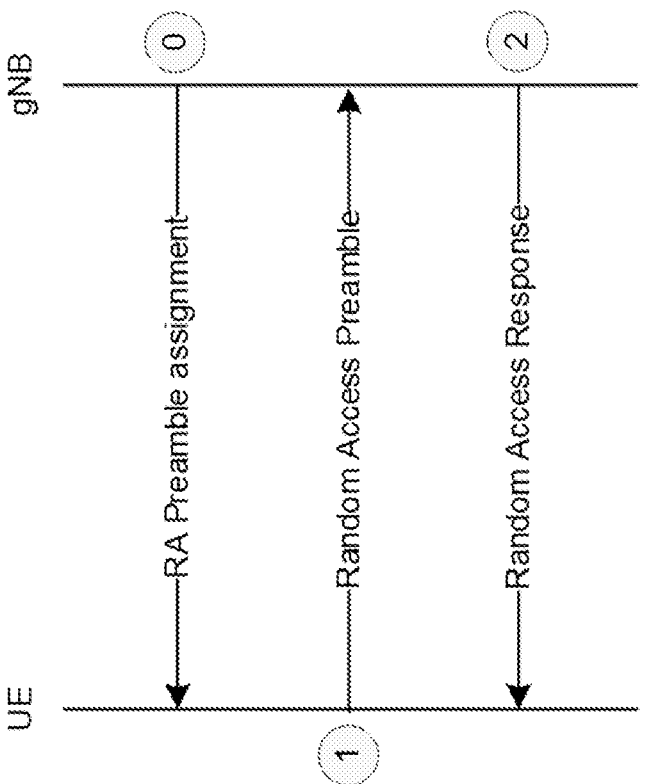

FIG. 1B to FIG. 1E shows examples of various random access (RA) procedures. For example, FIG. 1B depicts a contention based random access (CBRA) with a 4-step RA procedure. FIG. 1C depicts a CBRA with a 2-step RA procedure. FIG. 1D depicts a contention-free random access (CFRA) with a 4-step RA procedure. FIG. 1E depicts a CFRA with a 2-step RA procedure. In connection with FIGS. 1B, 1C, 1D and 1E, the following nomenclatures are used:

MSG1: preamble transmission of the 4-step RA procedure.

MSG2: response to MSG1.

MSG3: first scheduled transmission of the 4-step RA procedure.

MSG4: response to MSG3.

MS GA: preamble and payload transmissions of the 2-step RA type procedure.

MS GB: response to MSGA in the 2-step RA procedure. MSGB may include response(s) for contention resolution, fallback indication(s), and back off indication.

A RA procedure can be triggered by a number of events. Examples include: an initial access from RRC_IDLE, a RRC Connection Reestablishment procedure, a DL or UL data arrival during RRC_CONNECTED when UL synchronization status is "non-synchronized," a UL data arrival during RRC_CONNECTED when there are no PUCCH resources for SR available, a SR failure, a Request by RRC upon synchronous reconfiguration (e.g., handover), a transition from RRC_INACTIVE, establishing a time alignment for a secondary TAG, a request for Other system information, a beam failure recovery, or a consistent UL LBT failure on SpCell.

The RRC can support the following states: RRC_IDLE, RRC_INACTIVE, and RRC_CONNECTED. Examples of details associated with these states are provided as follows.

RRC_IDLE:
    PLMN selection;
    Broadcast of system information;
    Cell re-selection mobility;
    Paging for mobile terminated data is initiated by 5GC;
    DRX for CN paging configured by NAS.
RRC_INACTIVE:
    PLMN selection;
    Broadcast of system information;
    Cell re-selection mobility;
    Paging is initiated by NG-RAN (RAN paging);
    RAN-based notification area (RNA) is managed by NG-RAN;
    DRX for RAN paging configured by NG-RAN;
    5GC—NG-RAN connection (both C/U-planes) is established for UE;
    The UE AS context is stored in NG-RAN and the UE;
    NG-RAN knows the RNA which the UE belongs to.
RRC_CONNECTED:
    5GC—NG-RAN connection (both C/U-planes) is established for UE;
    The UE AS context is stored in NG-RAN and the UE;
    NG-RAN knows the cell which the UE belongs to;
    Transfer of unicast data to/from the UE;
    Network controlled mobility including measurements.

Example Embodiments

Embodiments of the present technology are directed at a network node using handover report information received from a UE to perform network performance optimization. For example, by using the information relating to a handover at the UE, a network can optimize configuration parameters so that the network (also termed herein as "network node," "NW," or "node") and UE (also termed herein as "wireless device") can perform handovers more effectively. In some embodiments, a network node sends (to a UE) handover configuration information that can be applicable to a potential handover (HO) associated with the UE. Examples of a handover can be regular HO, a conditional HO, or a Dual Active Protocol Stack (DAPS) HO. Handover configuration information sent by a network node can include at least one of: a reporting HO type, a threshold for time elapsed from conditional HO configuration reception to HO execution, a threshold for interruption time of DAPS HO, a threshold for a number of RA attempts by the UE to complete a RA procedure, a threshold for a ratio of RA attempts with lower Reference Signal Received Power (RSRP), a threshold for a total time consumed in a RA procedure, a threshold for ratio of a CERA (contention-free random access) attempt to a total number of attempts when a CFRA resource is configured, an indication for a selected RA beam not having the highest RSRP, and the like. Upon the UE undergoing a successful HO, the UE sends the HO report information to the network node for use in network performance optimization. In some implementations, various other types of reports can be received at a network node from a UE. Examples of these reports can be a slice information report, successful handover report, failure information report, mobility history information report, etc. In some embodiments, one or more information elements in a report from the UE to the base station can be selectively included in the report or excluded from the report to reduce signaling overhead in the air interface (i.e. the Uu interface).

Example Embodiment 1 (Successful HO Report)

Figure 2:
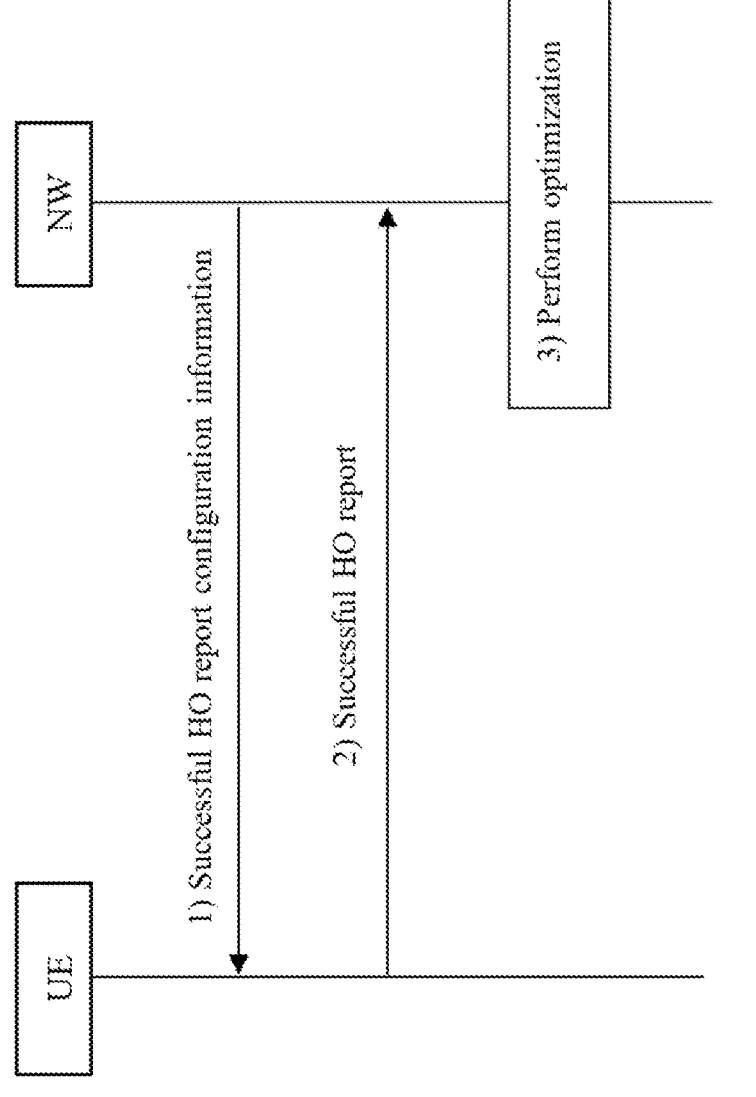
FIG. 2 is a signaling process for an example embodiment.

FIG. 2 is a signaling process for this example embodiment.

Step 1: A network sends a Successful HO report configuration information (a/k/a handover configuration information for a random access (RA) procedure or handover configuration information to facilitate reporting of successful handovers) to a UE. The Successful HO report configuration information can include at least one of: a reporting HO type, a threshold for time elapsed from Conditional HO configuration reception to HO execution, a threshold for interruption time of DAPS HO, a threshold for a number of RA attempts by the UE to complete the RA procedure, a threshold for ratio of RA attempts with lower Reference Signal Received Power (RSRP) to all RA attempts in a RA procedure, a threshold for total time used for a RA procedure, a threshold for the ratio of CFRA attempts to a total (cumulative) number of attempts when a CFRA resource is configured, an indication for a selected RA beam not having the highest RSRP, a threshold for the ratio of a (running) duration of the T312 timer from start until the UE receives a HO command to the NW-configured total time length of the T312 timer, or a threshold for the ratio of the (running) duration of the T310 timer from start until the UE receives a HO command to the NW-configured total time length of the T310 timer.

The reporting HO type can indicate a type of handover. For example, the type of HO can be a conditional HO, a DAPS HO, or a conventional HO. Conditional HOs and DAPS HOs can be regarded as unconventional HOs.

In some implementations, the Successful HO report configuration information can be included in the specified Radio Resource Control (RRC) Reconfiguration message.

In some implementations, the UE may indicate to the network that it has the capability of supporting or sending a Successful HO report. The NW may send the Successful HO report configuration information to the UE when the UE has indicated that it has the capability of supporting or sending Successful HO report.

Step 2: The UE sends a Successful HO report (a/k/a information reporting a successful handover) to the network according to the Successful HO report configuration information. For example, the UE may include in the Successful HO report the information of a successful HO with configured reporting HO type, according to the reporting HO type in the Successful HO report configuration information.

The UE may include in the Successful HO report the information of a successful HO only with Conditional HO and time elapsed from Conditional HO configuration reception to HO execution larger than a configured threshold, according to the threshold for time elapsed from Conditional HO configuration reception to HO execution in the Successful HO report configuration information.

The UE may include in the Successful HO report the information of a successful HO only with DAPS HO and interruption time of DAPS HO larger than a configured threshold, according to the threshold for interruption time of DAPS HO in the Successful HO report configuration information.

The UE may include in the Successful HO report the information of a successful HO only if the number of RA attempts by the UE to complete the RA procedure is larger than the NW-configured threshold, according to the threshold for the number of RA attempts by the UE to complete the RA procedure in the Successful HO report configuration information.

The UE may include in the Successful HO report the information of a successful HO only if the ratio of RA attempts with lower RSRP is larger than the network-configured threshold included in the Successful HO report configuration information.

The UE may include in the Successful HO report the information of a successful HO only if the total time used for a RA procedure is larger than the network-configured threshold included in the Successful HO report configuration information.

The UE may include in the Successful HO report the information of a successful HO only if the ratio of CFRA attempts to the total number of attempts with CFRA resource configured is larger than the network-configured threshold included in the Successful HO report configuration information.

The UE may include in the Successful HO report the information of a successful HO only if the ratio of CFRA attempts to the total number of attempts with CFRA resource configured is smaller than the network-configured threshold included in the Successful HO report configuration information.

The UE may include in the Successful HO report the information of a successful HO only if the selected RA beam not having the highest RSRP is indicated according to the NW-configured indication in the Successful HO report configuration information. For example, the NW-configured indication can be that the selected RA beam does not have the highest RSRP.

The UE may include in the Successful HO report the information of a successful HO only if the ratio of the running time length of T312 until the UE receives HO command compared to the configured total time length of T312 is larger, or larger or equal than the threshold for the above-mentioned ratio.

The UE may include in the Successful HO report the information of a successful HO only if the ratio of the running time length of T310 until the UE receives HO command compared to the configured total time length of T310 is larger, or larger or equal than the threshold for the above-mentioned ratio.

The UE may include in the Successful HO report the information of "more successful HO" when a fewer number of parameters are included in the Successful HO report configuration information. Alternately, the UE may include in the Successful HO report the information of "less successful HO" when a greater number of parameters are present in the Successful HO report configuration information.

In some implementations, the following use cases can be possible:

a. if the NW-configured HO type matches with a HO experienced by the UE, then the UE sends a report to the network;

b. if the NW-configured HO type does not match with a HO experienced by the UE, then the UE does not send a report to the network;

c. if (i) the NW-configured HO type matches with a HO experienced by the UE, and (ii) the NW-configured HO parameters are satisfied for the HO, then the UE sends a report to the network including the HO type and the HO parameters; and d. if (i) the NW-configured HO type does not match with a HO experienced by the UE, or (ii) the NW-configured HO parameters are not satisfied for the HO, then the UE does not send a report to the network.

The Successful HO report can include at least one of: a reporting HO type, a time elapsed from Conditional HO configuration reception to HO execution, an interruption time of DAPS HO, an indication to indicate whether RLF happens in source cell during DAPS HO procedure, a cause of RLF if RLF happens in source cell during DAPS HO procedure, a location information of RLF if RLF happens in source cell during DAPS HO procedure, a time elapsed from receiving DAPS HO command to RLF happens in source cell, a time elapsed from RLF happens in source cell to DAPS HO succeeds, a number of RA attempts used for UE to complete the RA procedure, a ratio of RA attempts with lower RSRP (e.g., lower than the NW-configured threshold), a total time used for RA procedure, a ratio of CFRA attempts to the total number of attempts when CFRA resource is configured, an indication for a selected RA beam not having the highest RSRP, a ratio of the running time length of T312 timer until the UE receives HO command compared to the configured total time length of T312 timer, a ratio of the running time length of T310 timer until the UE receives HO command compared to the configured total time length of T310 timer, an indication of whether the T312 timer is running, a configured total time length of T312 timer, a configured total time length of T310 timer, a running time length of T312 timer until the UE receives HO command, a running time length of T310 timer until the UE receives HO command, an information of RA resource used for the HO procedure (e.g. message 1 frequency start, message A frequency start, sub-carrier space, BWP information, beam index, beam type, number of preambles sent per beam for 2 step RA, number of preambles sent per beam for 4 step RA), an information of CFRA resource configured for the HO procedure, and/or a location information (e.g. GNSS location information, bluetooth measurements, WLAN measurements, sensor location information).

The Successful HO report can be included in the specified Measurement Report message, specified UE Information Response message, or a new message.

Step 3: The network may perform, for example, HO optimization or Random Access Channel (RACH) optimization, according to the Successful HO report. For example, the network may send the Conditional HO configuration to the UE with a slight delay (e.g., a little bit later) to shorten the time interval from Conditional HO configuration reception to HO execution, which can result in saving the resource in the candidate target cell(s).

Example Embodiment 1a (Successful HO Report)

Step 1: A UE sends a Successful HO report (a/k/a information reporting a successful handover) to the network. In this embodiment, the UE may send the Successful HO report to the network without any configuration from the network. The Successful HO report can include at least one of: a reporting HO type, a time elapsed from Conditional HO configuration reception to HO execution, an interruption time of DAPS HO, an indication to indicate whether RLF happens in source cell during DAPS HO procedure, a cause of RLF if RLF happens in source cell during DAPS HO procedure, a location information of RLF if RLF happens in source cell during DAPS HO procedure, a time elapsed from receiving DAPS HO command to RLF happens in source cell, a time elapsed from RLF happens in source cell to DAPS HO succeeds, a number of RA attempts used for UE to complete the RA procedure, a ratio of RA attempts with lower RSRP (e.g., lower than the NW-configured threshold), a total time used for RA procedure, a ratio of CFRA attempts to the total number of attempts when CFRA resource is configured, an indication for a selected RA beam not having the highest RSRP, a ratio of the running time length of T312 timer till the UE receives HO command compared to the configured total time length of T312 timer, a ratio of the running time length of T310 timer till the UE receives HO command compared to the configured total time length of T310 timer, an indication of whether T312 timer is running, a configured total time length of T312 timer, a configured total time length of T310 timer, a running time length of T312 timer till the UE receives HO command, a running time length of T310 timer till the UE receives HO command, an information of RA resource used for the HO procedure (e.g. message 1 frequency start, message A frequency start, sub-carrier spacing, BWP information, beam index, beam type, number of preambles sent per beam for 2 step RA, number of preambles sent per beam for 4 step RA), an information of CFRA resource configured for the HO procedure, and/or a location information (e.g. GNSS location information, bluetooth measurements, WLAN measurements, sensor location information).

The reporting HO type can indicate a type of handover. For example, the type of HO can be a conditional HO, a DAPS HO, or a conventional HO. Conditional HOs and DAPS HOs can be regarded as unconventional HOs.

The Successful HO report can be included in the specified Measurement Report message, specified UE Information Response message, or a new message.

In some implementations, the Successful HO report may be sent to the network only when the UE is nearing RLF at the moment of successful HO, e.g., when the T310 timer is running and/or the T312 timer is running.

In some implementations, the Successful HO report may be sent to the network only when the RA resource used for the Successful HO is sub-optimal. For example, the UE may include in the Successful HO report the information of a successful HO only when the beam of successful RA attempt (or last RA attempt) does not have the highest RSRP.

The UE may include in the Successful HO report the information of a successful HO only when the successful RA attempt (or last RA attempt) is not based on a dedicated RA resource, i.e., it is contention based.

The UE may include in the successful HO report the information of a successful HO only when the dedicated RA resource is not used during the HO procedure, e.g., all RA attempts during the HO procedure are contention based.

In some implementations, the above conditions can work in combination or independently. For example, the UE stores the successful HO report when both conditions are satisfied, e.g. the UE stores successful HO information when the successful HO is not based on the dedicated RA resource and the HO command is received by UE when the T312 timer is running Alternately, the UE may store the successful HO report when either of the condition is satisfied.

In some implementations, the Successful HO report may include multiple entries and each entry includes an information of a successful HO.

Step 2: The network may perform, for example, HO optimization or Random Access Channel (RACH) optimization, according to the Successful HO report. For example, the network may send the Conditional HO configuration to the UE with a slight delay (e.g., a little bit later) to shorten the time interval from Conditional HO configuration reception to HO execution, which can result in saving the resource in the candidate target cell(s).

Example Embodiment 2 (Successful HO Report)

FIG. 2 is a signaling process for this example embodiment.

Step 1: A network sends a Successful HO report configuration information to a UE.

The Successful HO report configuration information is an optional information element (IE) included in the specified RRC Reconfiguration message. Presence of this IE means the UE needs to report the Successful HO report. However, an absence of this IE can mean that the UE does not need to report the Successful HO report.

Step 2: The UE sends a Successful HO report to the network according to the Successful HO report configuration information.

If the UE needs to report the Successful HO report and the UE has a Successful HO report to transmit to the network, the UE may send the Successful HO report to the network, included in the specified Measurement Report message, or included in a new message.

If the UE needs to report the Successful HO report and the UE has a Successful HO report to transmit, the UE may firstly send an indication (e.g., included in the specified RRC Reconfiguration Complete message, or included in a new message) to the network to indicate that the UE has a Successful HO report to transmit to the network. The network may send the specified UE Information Request message to the UE, and, after receiving the indication, the UE sends the specified UE Information Response message to the network including the Successful HO report, according to the received UE Information Request message.

In some implementations, the UE may discard the stored Successful HO report after sending it to the network, or when it has been stored for a specified time and not fetched by (or, sent to) the network.

In some implementations, the UE may store the Successful HO report by overwriting the previous Successful HO report.

Step 3: The network may perform optimizations, for example, HO optimization or RACH optimization, according to the Successful HO report.

Example Embodiment 3 (Conditional HO)

Figure 3:
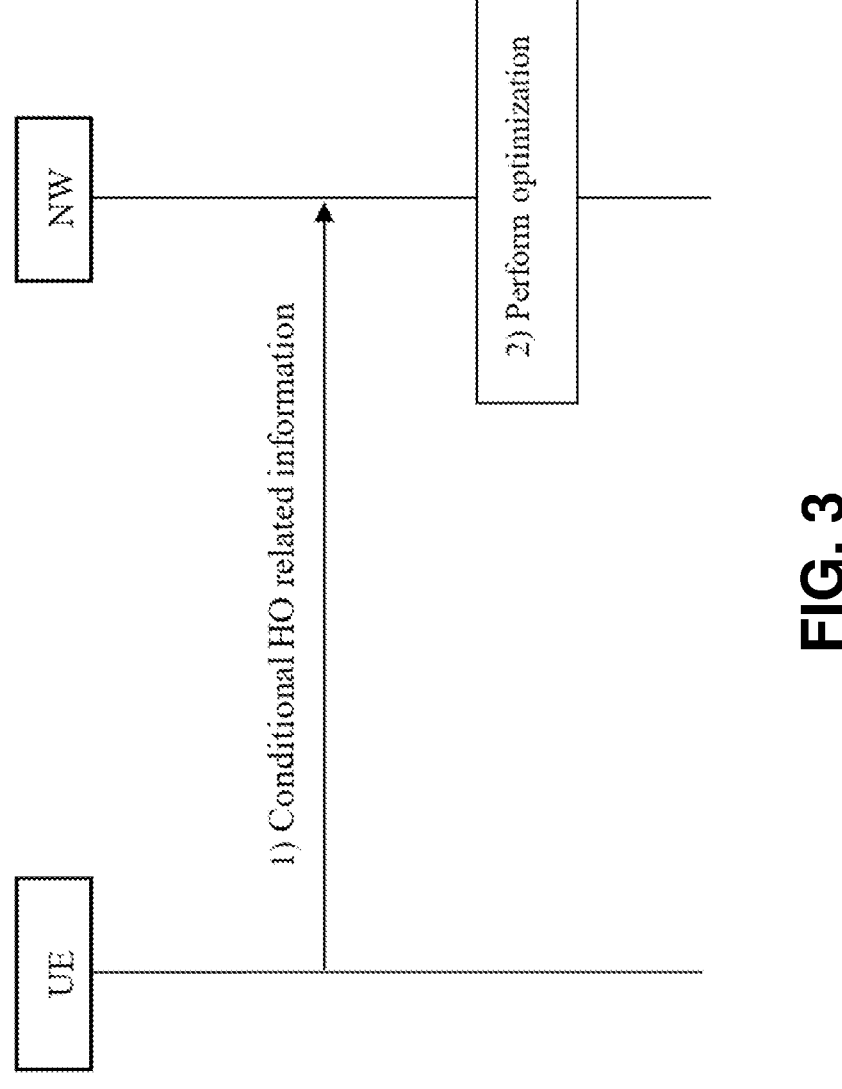
FIG. 3 is a signaling process for an example embodiment.

FIG. 3 is a signaling process for this example embodiment.

Step 1: A UE is subjected to a Conditional HO (termed as the first Conditional HO) failure, the UE selects a cell to perform RRC Reestablishment, and the selected RRC Reestablishment target cell is a Conditional HO candidate cell. The UE performs the RRC Reestablishment as a Conditional HO (termed as the second Conditional HO).

The UE sends the Conditional HO related information to the network, where the Conditional HO related information includes at least one of: a list of candidate cells, a measurement result of candidate cells at the first Conditional HO execution, a measurement result of candidate cells at the second Conditional HO execution, a list of candidate cells fulfilling the Conditional HO execution condition at the first Conditional HO execution, a measurement result of candidate cells fulfilling the Conditional HO execution condition at the first Conditional HO execution, a list of candidate cells fulfilling the Conditional HO execution condition at the second Conditional HO execution, a measurement result of candidate cells fulfilling the Conditional HO execution condition at the second Conditional HO execution, a Conditional HO execution condition, a first Conditional HO target cell, a measurement result of the first Conditional HO target cell, a second Conditional HO target cell, a measurement result of the second Conditional HO target cell, a rule of selecting the first Conditional HO target cell among candidate cells fulfilling the Conditional HO execution condition, or an indication of whether the measurement result of the second Conditional HO target cell fulfills the Conditional HO execution condition.

In some implementations, the second Conditional HO execution refers to the Conditional HO execution when the T311 timer is running, e.g., when reestablishment is performed, and the reestablishment target cell is a Conditional HO candidate cell.

The Conditional HO related information can be included in the specified Radio Link Failure (RLF) Report, Successful HO report, or a new report. The Conditional HO related information can be carried in the specified UE Information Response message, or a new message.

If the UE has the Conditional HO related information to report, the UE may firstly send an indication to the network to indicate that the UE has available Conditional HO related information to report, for example, included in the specified RRC Reconfiguration Complete message, or included in a new message. The network may send the specified UE Information Request message to the UE. After the UE receives the indication, the UE sends the specified UE Information Response message to the network including the Conditional HO related information, according to the received UE Information Request message.

Step 2: The network may perform, for example, Conditional HO optimization, according to the Conditional HO related information. For example, the network may ask the UE to update the rule of selecting the first Conditional HO target cell among the candidate cells fulfilling the Conditional HO execution condition, according to the second Conditional HO target cell and the list of candidate cells fulfilling the Conditional HO execution condition at the first Conditional HO execution. If the second Conditional HO target cell is included in the list of candidate cells fulfilling the Conditional HO execution condition at the first Conditional HO execution, then the UE may select the second Conditional HO target cell at the first Conditional HO execution, to increase the success rate and promptness of Conditional HO.

For example, in some implementations, after the UE receives the conditional HO configuration from the NW (including one or more candidate target cells), the UE will monitor whether the configured condition is fulfilled for the candidate target cell(s). When at least one candidate target cell fulfills the first conditional HO execution condition, the UE executes the first conditional HO (i.e., the UE performs the first conditional HO execution). If the first conditional HO fails, the UE may select another candidate target cell to perform the second conditional HO (i.e., second conditional HO execution).

Example Embodiment 4 (Failure Report)

Figure 4:
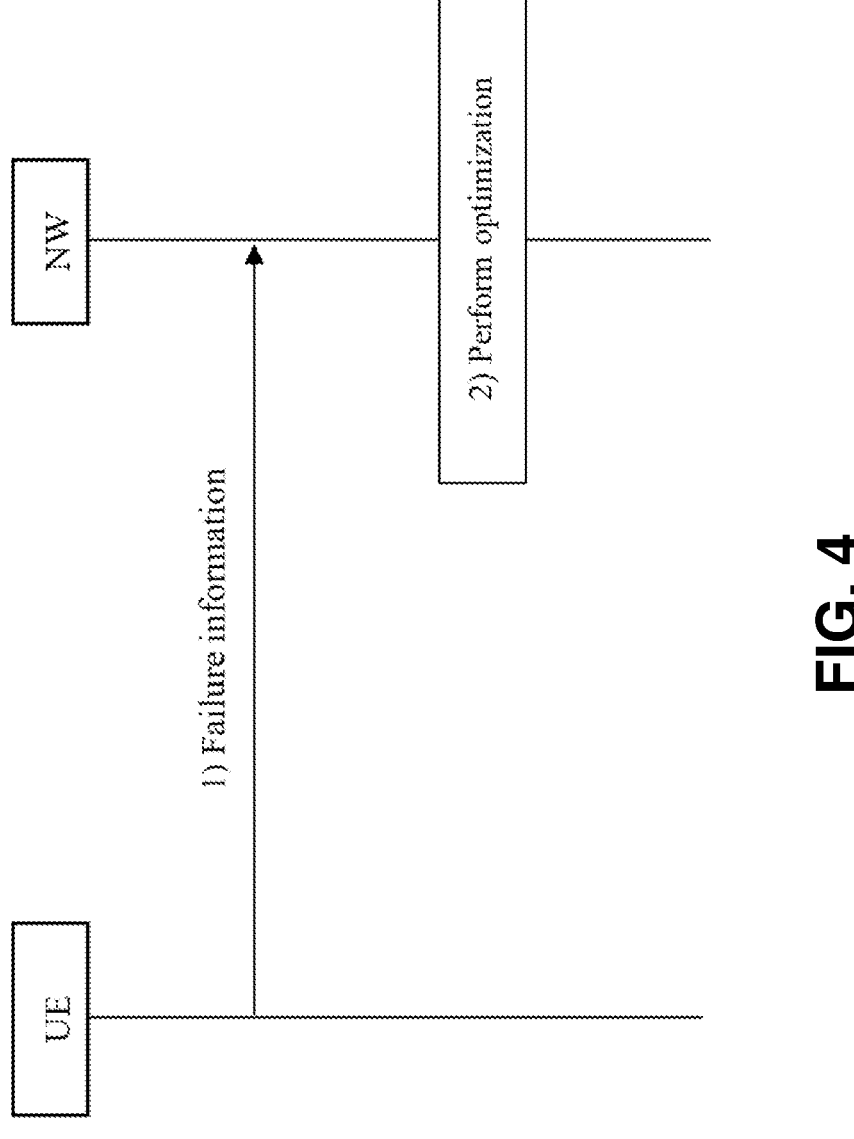
FIG. 4 is a signaling process for an example embodiment.

FIG. 4 is a signaling process for this example embodiment.

Step 1: In some scenarios, a UE experiences one or more failures. The UE reports the failure information (a/k/a failure information report) relating to one or more failures to the network. The failure information includes one or more failure information entries: one entry for each failure. The failure information entry includes at least one of: a failure type (e.g., RLF, a Handover Failure (HOF), a Conditional HOF, a DAPS HOF), an indication of whether a current entry is related to the last previous entry, a time elapsed from the last previous failure to a current failure, or an indication of whether fallback to the source cell occurs during DAPS HO.

In some implementations, the UE may send the failure information only for a configured failure type requested by the network.

The UE may send the failure information to the network, including the failure information entry with an indication that this entry is related to the last previous entry and the last previous entry has the failure type requested by the network, even if the failure type of this entry is not requested by the network.

Step 2: The network may perform, for example, HO optimization, according to the failure information.

Example Embodiment 5 (Failure Report)

Figure 5:
FIG. 5 is a signaling process for an example embodiment.
Figure 5:
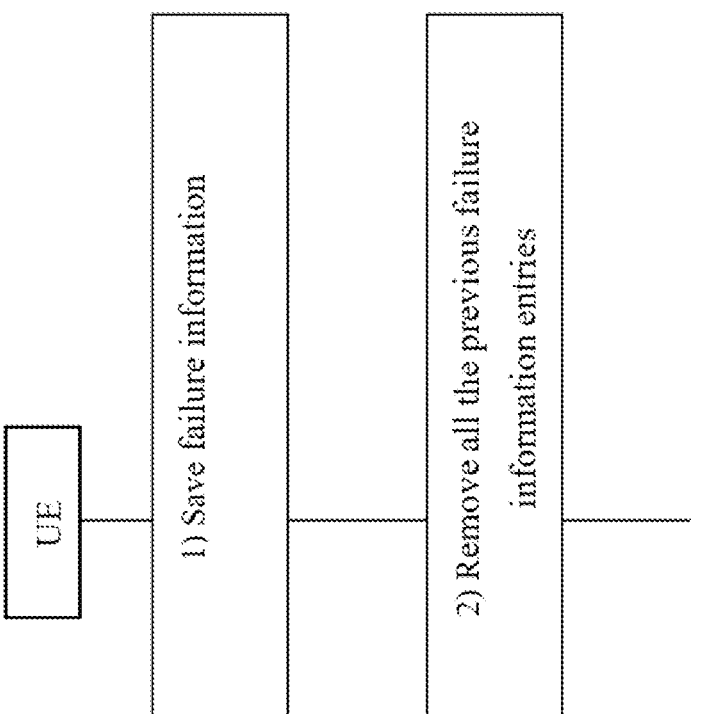

FIG. 5 is a signaling process for this example embodiment.

Step 1: A UE experiences one or more failures. The UE saves the failure information; the failure information includes one or more failure information entries, with one entry for each failure; and each failure information entry includes at least one of: failure type (e.g., RLF, HOF, Conditional HOF, DAPS HOF), indication of whether this entry is related to the last previous entry, time elapsed from the last previous failure to this failure, and indication of whether fallback to the source cell occurs during DAPS HO.

Step 2: The UE removes all of the previous failure information entries, when the time elapsed from the last previous failure to this failure is larger than a configured threshold.

Example Embodiment 6 (UE Status)

Figure 6:
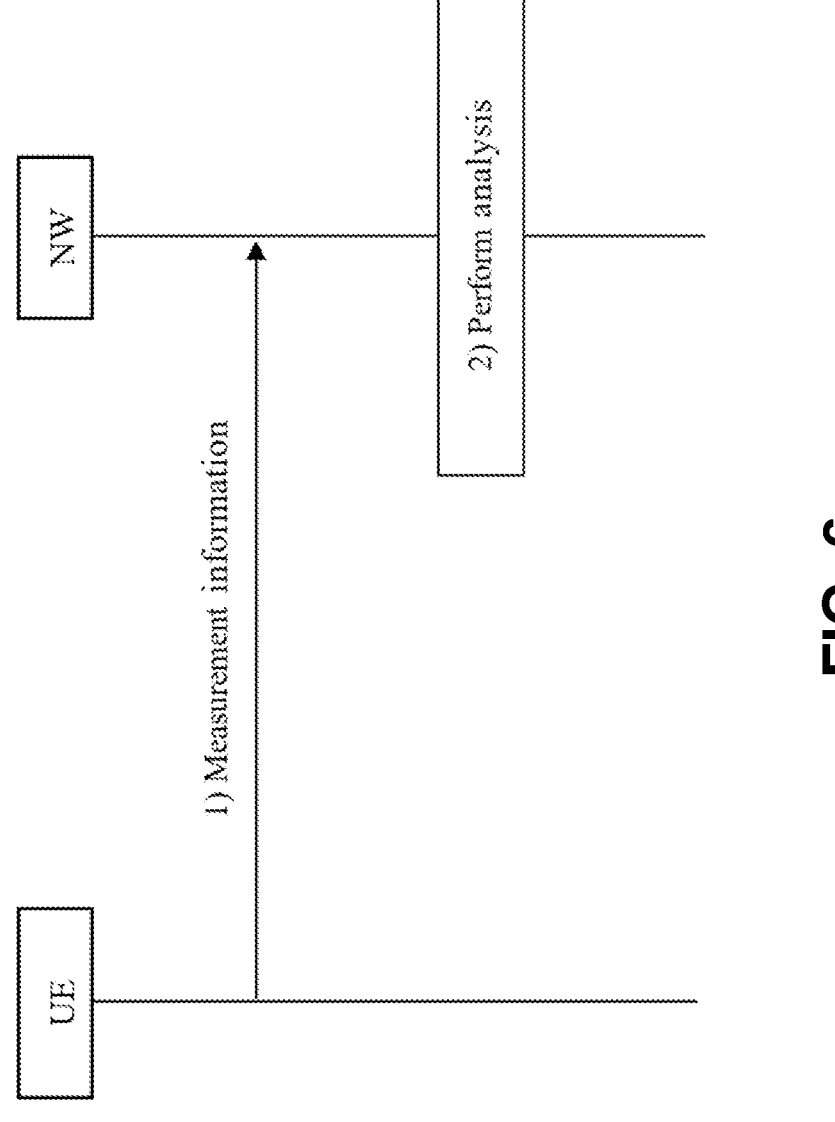
FIG. 6 is a signaling process for an example embodiment.

FIG. 6 is a signaling process for this example embodiment.

Step 1: The UE reports measurement information to network. The measurement information includes one or more measurement information entries, with one entry for each measurement performed in the UE. The measurement information entry includes at least one of: a measurement result (e.g., Reference Signal Received Quality (RSRQ)), UE status (e.g., In-Device Coexistence detected, overheating, RRM relaxation, out of area configuration) to indicate the UE status when performing the measurement, indication of In-Device Coexistence detected in UE, indication of overheating in UE, indication that the UE is performing Radio Resource Management (RRM) relaxation, indication that the UE is out of area configuration (e.g., UE does not report measurement result when it is not in a configured geographical area), interference direction (e.g., NR, LTE, or both NR and LTE) when In-Device Coexistence is detected in UE, affected frequency information when In-Device Coexistence is detected in UE, or victim system type (e.g., GPS, GLONASS, BDS, Galileo, NavIC, WLAN, Bluetooth) when In-Device Coexistence is detected in UE.

In some implementations, the measurement information entry may not include the measurement result; in that case, the measurement information entry includes at least one other parameter. The measurements may be performed by the UE in RRC_IDLE, RRC_INACTIVE, or RRC_CON-NECTED.

The measurement information can be included in the specified Measurement Report message, specified UE Information Response message, or a new message.

Step 2: The network analyzes the measurement information. For example, the network may consider the measurement result in a measurement information entry to be invalid because the measurement is performed in an unexpected UE status, or it can determine that the reason of a measurement information entry without a measurement result is because of out of area configuration. In some implementations, the network can determine In-Device Coexistence is detected in the UE from analyzing the failure report.

Example Embodiment 7 (Slice Resource Information)

Step 1: The UE sends a slice resource information report to the network. The slice resource information report is related to slice resources and includes at least one of: cell ID, indication of shortage of slice resource, indication of shortage of slice-specific RA resource, cause value of shortage of slice resource, cause value of shortage of slice-specific RA resource, or slice ID (e.g., S-NSSAI). A slice-specific RA resource is a type of RA resource that is "tied" to a slice. For example, some RA resources may be available exclusively to certain slices. Those RA resources can be considered to be slice-specific. The slice ID can be an ID of slice with shortage of slice resource, the ID of slice related to the slice-specific RA resource with shortage of RA resource, or the ID of slice related to the slice-specific RA resource.

The slice resource information can be obtained in case of RLF, connection establishment failure (CEF), RA failure, or RA success; in cases where the UE receives the RRC Release message including the slice ID and/or the cause value of shortage of slice resource; in cases where the UE receives the MSG4 including the slice ID and/or the cause value of shortage of slice resource; or in cases where the UE receives the MSGB including the slice ID and/or the cause value of shortage of slice resource. The slice resource information can be included in the specified RLF report, CEF report, or RA report.

Step 2: The network may perform, for example, optimization for slice resource allocation, according to the slice resource information.

In some implementations, presence of an IE in the slice resource information indicates a shortage of a resource. Absence of the IE indicates no shortage of the resource.

Example Embodiment 8 (Mobility History Information)

Step 1: Upon change of a cell, the UE saves a new Mobility history information entry included in Mobility history information, regardless of RRC_IDLE, RRC_INAC-TIVE, or RRC_CONNECTED. Each Mobility history information entry includes at least one of: absolute time when entering this cell, relative time elapsed from the last previous cell to this cell, location information when entering this cell, a list of location information in this cell (each location information of the list is measured at each time interval, the time interval can be configured, and the first location information of the list is measured when entering this cell).

Step 2: The UE may send the saved Mobility history information (including one or more Mobility history information entries) to the network when the RRC state changes to RRC_CONNECTED.

Step 3: The network may analyze the Mobility history information, for example, to estimate the UE speed or UE moving trajectory.

Example Embodiment 9 (DAPS HO)

Step 1: A UE experiences RLF in a target cell before the UE receives the daps-SourceRelease message from the target cell, or the UE experiences HOF during DAPS HO. The daps-SourceRelease message is sent by the target cell.

Step 2: The UE performs fallback to the source cell and sends a fallback indication to the network node associated with the source cell. The fallback indication may be included in the specified failure information message used to report DAPS HOF. Alternatively, or in combination with the above, the UE records a RLF report including a failure type of DAPS HO failure and an indication of the fallback to the source cell. The UE may send the RLF report to the network node associated with the source cell when the UE succeeds in performing the fallback to the source cell, e.g., for self-optimization network (SON) purposes.

Step 3: The network node to which the source cell belongs may send a HO cancel message to the target cell after receiving the fallback indication.

Example Embodiment 9a (DAPS HO)

Step 1: A UE experiences HOF during DAPS HO and performs fallback to the source cell. The UE records a first RLF report including a failure type of HOF or DAPS HO failure, and optionally an indication of the fallback to the source cell.

Step 2: In some implementations, RLF is detected initially in the UE followed by RLF detection in the source cell. In some implementations, RLF is detected initially in the source cell followed by RLF detection in the UE. The UE records a second RLF report including a failure type of RLF, and optionally a time elapsed between the DAPS HOF to the RLF in the source cell or a time elapsed between the fallback to the source cell and the RLF in the source cell.

Step 3: The UE sends the two RLF reports to the network node when it is successfully connected to the network node afterwards, e.g., for self-optimization network (SON) purposes. The two RLF reports may be sent to the network node in one message with two entries, or in two messages.

Example Embodiment 9b (DAPS HO)

Step 1: A UE experiences HOF during DAPS HO and performs fallback to the source cell. The UE records a RLF report including a failure type of HOF or DAPS HO failure, and optionally an indication of the fallback to the source cell.

Step 2: In some implementations, RLF is detected initially in the UE followed by RLF detection in the source cell. In some implementations, RLF is detected initially in the source cell followed by RLF detection in the UE. If the time elapsed between the DAPS HOF and the RLF in the source cell (or the time elapsed between the fallback to the source cell and the RLF in the source cell) is larger, or larger or equal than a configured or specified threshold, the UE records a new RLF report replacing the previous RLF report. In the new RLF report, the UE can include a failure type of RLF and optionally a time elapsed between the DAPS HOF and the RLF in the source cell or a time elapsed between the fallback to the source cell and the RLF in the source cell. Otherwise, the previous RLF report is retained, and optionally a time elapsed between the DAPS HOF and the RLF in the source cell or a time elapsed between the fallback to the source cell and the RLF in the source cell is added to the previous RLF report. Thus, in some embodiments, the UE can generate only one RLF report.

Step 3: The UE sends the RLF report to the network node when it is successfully connected to the network node afterwards, e.g., for self-optimization network (SON) purposes.

Example Embodiment 9c (DAPS HO)

Step 1: A UE experiences HOF during DAPS HO and performs fallback to the source cell.

Step 2: The UE happens RLF in the source cell afterwards. The UE records a RLF report including at least one of: a failure type of RLF, an indication of whether a DAPS HOF happened previously, an indication of whether a fallback to the source cell happened previously, a time elapsed between the previous DAPS HOF and the RLF in the source cell, a time elapsed between the previous fallback to the source cell and the RLF in the source cell, a cell ID of the source cell of the previous DAPS HO, a cell ID of the target cell of the previous DAPS HO, an indication of whether the previous HO is a DAPS HO.

Step 3: The UE sends the RLF report to the network node when it is successfully connected to the network node afterwards, e.g., for self-optimization network (SON) purposes.

Example Embodiment 10 (RA Report)

Step 1: A UE sends a RA report to a network node. The RA report can include one or more RA report entries. Each RA report entry includes at least one of: a cell ID and a cell type (e.g., PCell, PSCell, MCG SCell, SCG SCell, MCG Cell, SCG Cell).

Step 2: The network node may send the RA report to a second network node, according to the cell ID included in the RA report. The sent RA report may only include the RA report entry with the cell ID of the second network node. In a Dual Connectivity (DC) operation, the network node acting as a Master node (MN) may send the RA report to another network node acting as a Secondary node (SN). The RA report sent from the MN to the SN may only include the RA report entry with the cell ID belonging to the SN and for certain cell types (e.g., PSCell, SCG SCell, SCG Cell).

System Implementations

Figure 7:
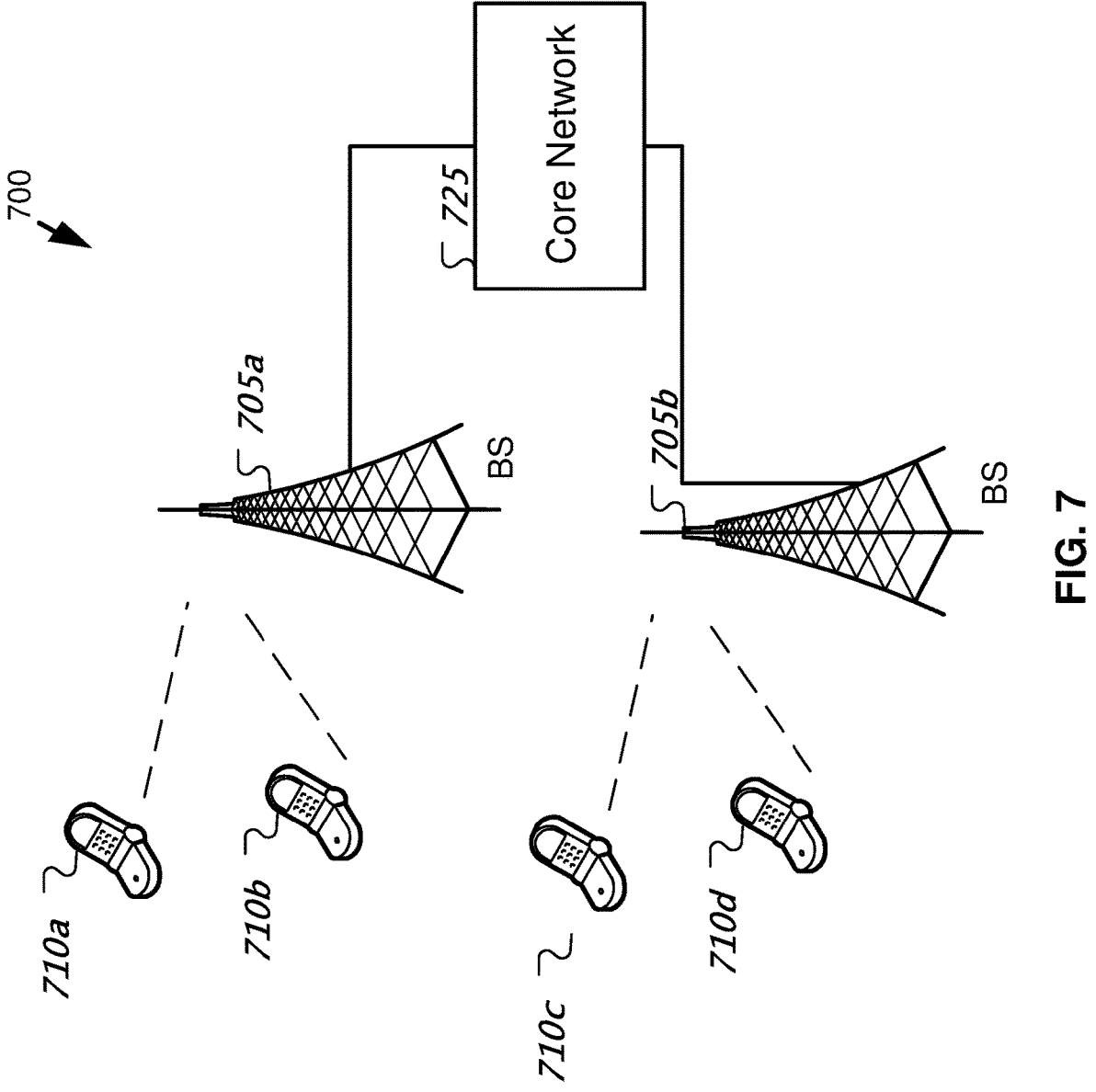
FIG. 7 shows an example of a wireless communication system where techniques in accordance with one or more embodiments of the present technology can be applied.

FIG. 7 shows an example of a wireless communication system where techniques in accordance with one or more embodiments of the present technology can be applied. A wireless communication system 700 can include one or more base stations (BSs) 705a, 705b, one or more wireless devices 710a, 710b, 710c, 710d, and a core network 725. A base station 705a, 705b can provide wireless service to wireless devices 710a, 710b, 710c, and 710d in one or more wireless sectors. In some implementations, a base station 705a, 705b includes directional antennas to produce two or more directional beams to provide wireless coverage in different sectors.

The core network 725 can communicate with one or more base stations 705a, 705b. The core network 725 provides connectivity with other wireless communication systems and wired communication systems. The core network may include one or more service subscription databases to store information related to the subscribed wireless devices 710a, 710b, 710c, and 710d. A first base station 705a can provide wireless service based on a first radio access technology, whereas a second base station 705b can provide wireless service based on a second radio access technology. The base stations 705a and 705b may be co-located or may be separately installed in the field according to the deployment scenario. The wireless devices 710a, 710b, 710c, and 710d can support multiple different radio access technologies. In some embodiments, the base stations 705a, 705b may be configured to implement some techniques described in the present document. The wireless devices 710a to 710d may be configured to implement some techniques described in the present document.

In some implementations, a wireless communication system can include multiple networks using different wireless technologies. A dual-mode or multi-mode wireless device includes two or more wireless technologies that could be used to connect to different wireless networks.

Figure 8:
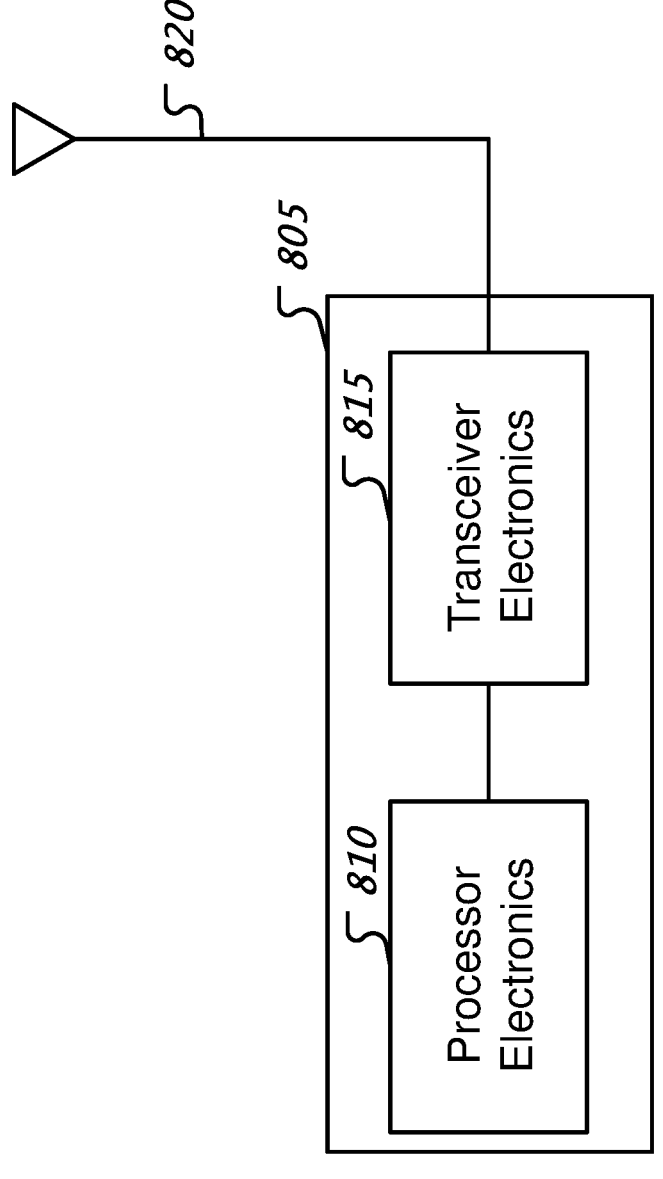
FIG. 8 is a block diagram representation of a portion of a hardware platform.

FIG. 8 is a block diagram representation of a portion of a hardware platform. A hardware platform 805 such as a network node or a base station or a wireless device (or UE) can include processor electronics 810 such as a microprocessor that implements one or more of the techniques presented in this document. The hardware platform 805 can include transceiver electronics 815 to send and/or receive wired or wireless signals over one or more communication interfaces such as antenna 820 or a wireline interface. The hardware platform 805 can implement other communication interfaces with defined protocols for transmitting and receiving data. The hardware platform 805 can include one or more memories (not explicitly shown) configured to store information such as data and/or instructions. In some implementations, the processor electronics 810 can include at least a portion of the transceiver electronics 815. In some embodiments, at least some of the disclosed techniques, modules or functions, a central node, a distributed node, a terminal or network nodes are implemented using the hardware platform 805.

Some embodiments of the disclosed technology are presented in clause-based format.

Figure 9:
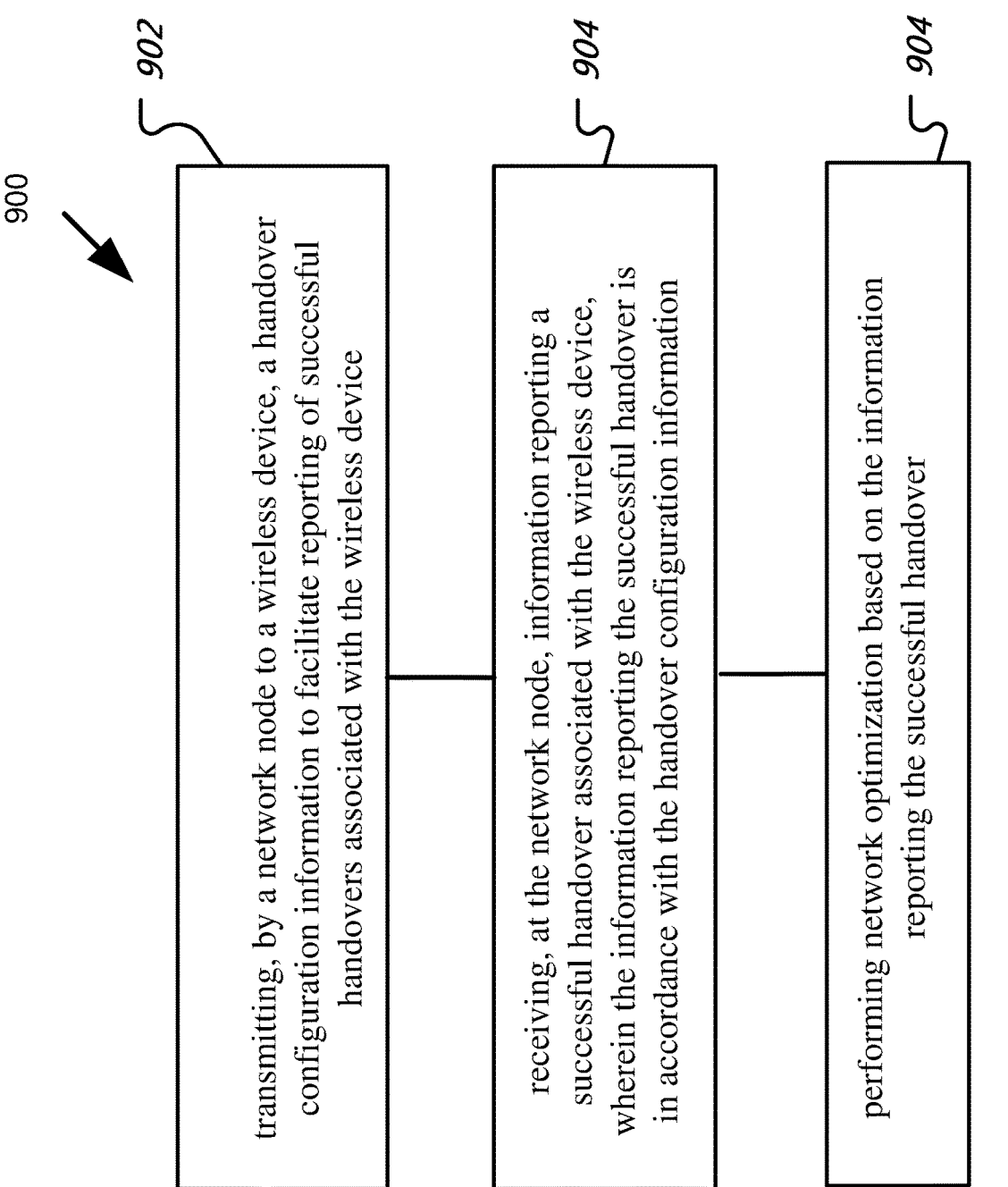
FIG. 9 illustrates a flowchart of an example method associated with performing network optimization.

1. A method (e.g., method 900 depicted in FIG. 9 in connection with embodiment 1 discussed herein) for wireless communications comprising:

transmitting (902), by a network node to a wireless device, a handover configuration information to facilitate reporting of successful handovers associated with the wireless device;

receiving (904), at the network node, information reporting a successful handover associated with the wireless device, wherein the information reporting the successful handover is in accordance with the handover configuration information; and performing (906) network optimization based on the information reporting the successful handover.

2. The method of clause 1, wherein the handover configuration information is included as part of a Radio Resource Control (RRC) message.

3. The method of any one or more of clauses 1-2, wherein the handover configuration information include at least one of: a desired handover type, a threshold for time elapsed between conditional handover command reception and conditional handover execution, a threshold for interruption time of Dual Active Protocol Stack (DAPS) handover, a threshold for a cumulative number of RA attempts by the wireless device to complete a RA procedure, a threshold for a ratio of RA attempts with lower Reference Signal Received Power (RSRP) to the cumulative number of RA attempts by the wireless device to complete the RA procedure, a threshold for a total time consumed in the RA procedure, a threshold for a ratio of CFRA attempts to the cumulative number of RA attempts when a CFRA resource is configured, or an indication of a selected RA beam failing to have a highest RSRP.

4. The method of clause 3, wherein the desired handover type includes one of: a conditional handover, a DAPS handover, or a conventional handover.

5. The method of clause 4, wherein the information reporting the successful handover includes at least one successful handover parameter that satisfies a condition associated with the one or more parameters in the handover configuration information sent by the network node.

6. The method of clause 5, wherein a type of the successful handover is a conditional handover for which time elapsed between conditional handover command reception and conditional handover execution is larger than a respective threshold included in the configuration information sent by the network node.

7. The method of clause 5, wherein a type of the successful handover is a DAPS handover for which an interruption time is larger than a respective threshold included in the configuration information sent by the network node.

8. The method of clause 5, wherein a cumulative number of RA attempts by the wireless device to complete the RA procedure is larger than a respective threshold included in the configuration information sent by the network node.

9. The method of clause 5, wherein a ratio of RA attempts with lower Reference Signal Received Power (RSRP) to the cumulative number of RA attempts is larger than a respective threshold included in the configuration information sent by the network node.

10. The method of clause 5, wherein a total time consumed in the RA procedure is larger than a respective threshold included in the configuration information sent by the network node.

11. The method of clause 5, wherein a ratio of CFRA attempts to the cumulative number of RA attempts when a CFRA resource is configured is less than a respective threshold included in the configuration information sent by the network node.

12. The method of clause 5, wherein a selected RA beam failing to have the highest RSRP matches a respective indication included in the configuration information sent by the network node.

13. The method of any one or more of clauses 1-12, wherein the information reporting the successful handover is included as part of a measurement report message from the wireless device to the network node.

14. The method of any one or more of clauses 1-12, wherein the information reporting the successful handover is included as part of an information response message from the wireless device to the network node.

15. The method of any one or more of clauses 1-12, wherein the information reporting the successful handover is included as part of a new message from the wireless device to the network node.

16. The method of any one or more of clauses 1-15, wherein, in a case that the match between the desired handover type and the type of the successful handover fails to exist, or at least one successful handover parameter fails to satisfy a condition associated with the one or more parameters in the handover configuration information, the information reporting the successful handover associated with the wireless device is prevented from transmission to the network node.

17. The method of clause 16, wherein preventing transmission of the information reporting the successful handover results in reduced signaling overhead.

Figure 10:
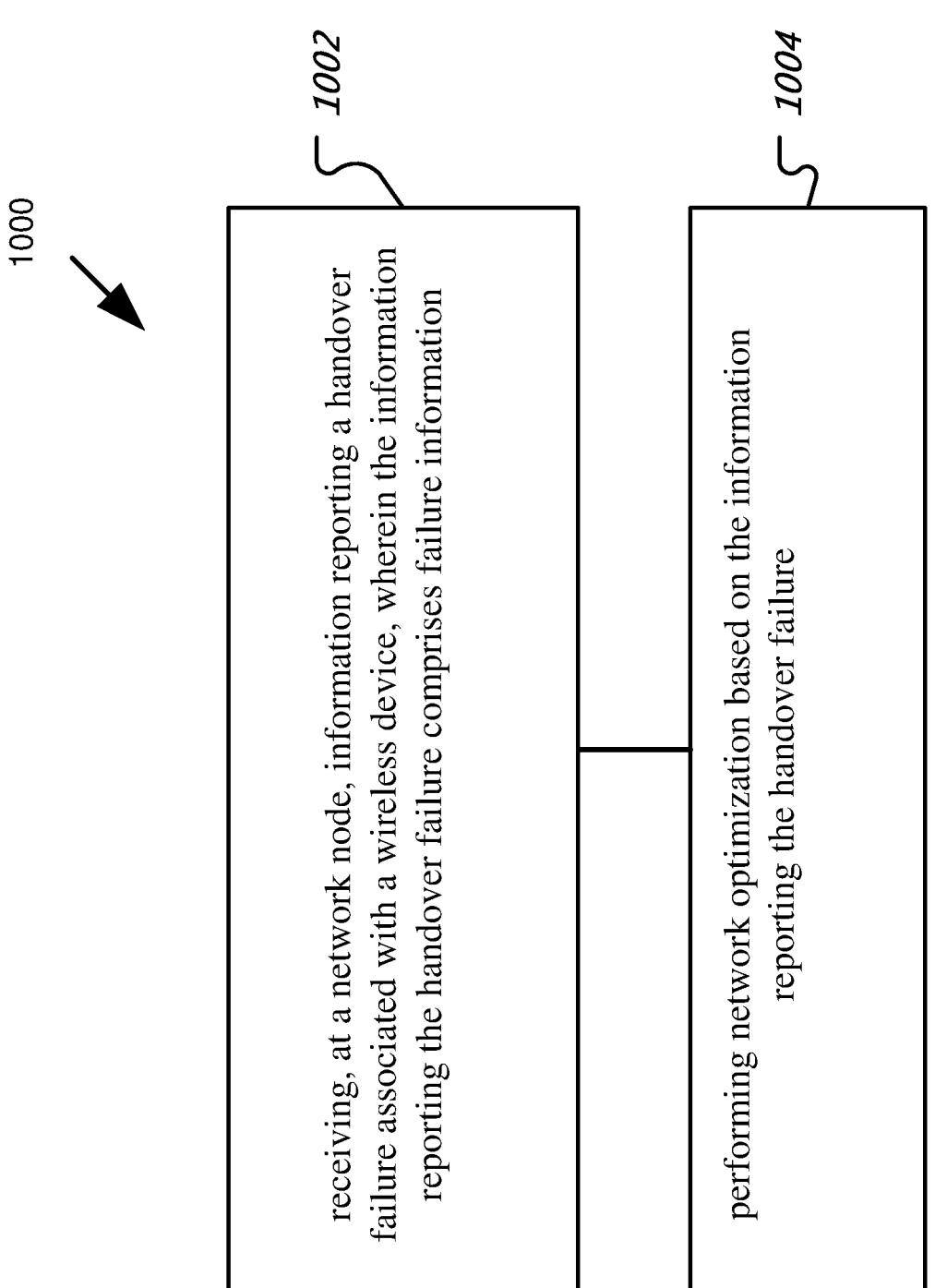
FIG. 10 illustrates a flowchart of an example method associated with performing network optimization.

18. A method (e.g., method 1000 depicted in FIG. 10 in connection with embodiment 4 discussed herein) for wireless communications comprising:

receiving (1002), at a network node, information reporting a handover failure associated with a wireless device, wherein the information reporting the handover failure comprises failure information; and performing (1004) network optimization based on the information reporting the handover failure.

19. The method of clause 18, wherein the failure information includes at least one of: a type of failure and/or an indication whether the handover failure is related to a previous failure and/or a time elapsed since the previous failure and/or an indication whether fallback to a source cell occurs during a Dual Active Protocol Stack (DAPS) handover.

20. The method of clause 19, wherein the type of failure includes one of: a Radio Link Failure (RLF), a conditional handover failure, a DAPS handover failure, or a conventional handover failure.

21. The method of any one or more of clauses 18-20, further comprising:

sending, by the network node to the wireless device, a request for the information reporting the handover failure, wherein the request pertains to a particular type of failure.

22. The method of clause 21, wherein the information reporting the handover failure is received at the network node irrespective of whether the handover failure matches with the particular type of failure included in the request sent by the network node.

23. The method of any one or more of clauses 18-22, wherein the failure information associated with a previous failure are removed in a case that time elapsed since the previous failure exceeds a predetermined threshold.

24. The method of clause 23, wherein the predetermined threshold corresponds to a configuration information sent by the network node to the wireless device.

25. The method of any one or more of clauses 18-24, further comprising:

preventing, by the network node, the wireless device from transmitting the information reporting the handover failure, wherein the preventing results in reduced signaling overhead.

26. The method of any one or more of clauses 1-25, wherein the network node includes a base station, a 5G Core network, a centralized unit (CU), a distributed unit (DU), a centralized unit control plane (CU-CP), or a centralized unit user plane (CU-UP).

27. An apparatus for wireless communication comprising a processor that is configured to carry out the method of any one or more of clauses 1-25.

28. A non-transitory, computer-readable medium having code stored thereon, the code, when executed by a processor, causing the processor to implement a method recited in any one or more of clauses 1-26.

Some additional embodiments are presented in clause-based format.

D1. A method for wireless communications comprising:

receiving, at a network node communicably coupled to a wireless device, information reporting device-side measurements related to a Radio Resource Control (RRC) state associated with the wireless device; and determining that at least one of the device-side measurements is invalid, based on detecting an unexpected measurement entry and/or a missing measurement entry and/or a non-supported measurement entry.

D2. The method of clause D1, wherein the RRC state of the wireless device includes one of: idle (denoted RRC_IDLE), inactive (denoted RRC_INACTIVE), or connected (denoted RRC_CONNECTED).

D3. The method of clause D1, wherein the unexpected measurement entry corresponds to an unexpected status of the wireless device at a time instant of performing a device-side measurement.

D4. The method of clause D1, wherein the missing measurement entry corresponds to an in-device coexistence interference caused due to interference from overlapping frequency bands associated with the wireless device.

D5. The method of clause D1, wherein the non-supported measurement entry corresponds to an out of area configuration of the wireless device as a result of mobility of the wireless device.

D6. The method of clause D5, wherein, the non-supported measurement entry is due to a lack of configuration from the network node to the wireless device to perform a device-side measurement at a specific geographical area.

D7. The method of any one or more of clauses D1-D4, wherein the measurement entries related to the RRC state of the wireless device include at least one of: a Reference Signal Received Power (RSRP), a Reference Signal Received Quality (RSRQ), a wireless device status corresponding to a status of the wireless device at a time instant of performing a measurement, an indication of in-device coexistence interference caused due to interference from overlapping frequency bands associated with the wireless device, an indication of overheating of the wireless device, an indication of a Radio Resource Management (RRM) relaxation associated with the wireless device, an indication of an out of area configuration of the wireless device as a result of mobility of the wireless device, an interference direction corresponding to the in-device coexistence interference detected, an information relating to affected frequency bands when in-device coexistence interference is detected, or an identification of an affected technology associated with the wireless device when in-device coexistence interference is detected.

D8. The method of clause D7, wherein the interference direction is associated with new radio (NR) technology, or long term evolution (LTE) technology, or a combination thereof.

D9. The method of clause D7, wherein the affected technology associated with the wireless device when in-device coexistence interference is detected includes one of: global positioning system (GPS), global navigation satellite system (GLONASS), BeiDou navigation satellite system (BDS), Galileo, NavIC, WLAN, or Bluetooth.

D10. The method of any one or more of clauses D1-D9, wherein the information reporting device-side measurements includes a first information that when present indicates an anomalous condition of the wireless device and/or a second information comprising the measurement entries related to the wireless device.

D11. The method of clause D10, wherein the anomalous condition represented by the first information includes one of: out of area configuration of the wireless device, in-device coexistence interference associated with the wireless device, or an unexpected status of the wireless device.

D12. The method of any one or more of clauses D10-D11, wherein an absence of the first information from the information reporting device-side measurements represents a condition of non-anomalous state of the wireless device.

E1. A method for wireless communications comprising:

receiving, at a network node communicably coupled to a wireless device, slice resource information associated with the wireless device; and performing, at the network node, network optimization based on the slice resource information.

E2. The method of clause E1, wherein the slice resource information includes at least one of: a cell ID, an indication of shortage of a slice resource, an indication of shortage of a slice-specific RA resource, a cause value of the shortage of the slice resource, a cause value of shortage of the slice-specific RA resource, or a slice ID.

E3. The method of any one or more of clauses E1-E2, wherein the slice resource information is included as part of a radio link failure (RLF) report, a connection establishment failure (CEF), or a RA report.

E4. The method of any one or more of clauses E1-E3, wherein the network optimization includes allocation of the one or more slices based on the slice resource information associated with the wireless device.

E5. The method of any one or more of clauses E1-E3, wherein the slice resource information is received at the network node in response to at least one of the following events: a RLF associated with the wireless device, a CEF associated with the wireless device, a RRC release message associated with the wireless device, a message 4 for a 4-step RA procedure associated with the wireless device, or a message B for a 2-step RA procedure associated with the wireless device.

E6. The method of clause E5, wherein the RRC release message, the message 4, and the message B each include an ID of a slice subjected to a shortage of a resource and/or a corresponding reason for the shortage.

E7. The method of any one or more of clauses E1-E6, wherein the slice resource information comprises a first information that is selectively included or excluded, wherein, a presence of the first information indicates a shortage of one or more slice resources and/or a second information describes a reason for the shortage.

E8. The method of clause E7, wherein an absence of the first information from the slice resource information represents a condition of no shortage of slice resources.

F1. A method for wireless communications comprising:

receiving, at a network node communicably coupled to a wireless device, mobility history information associated with

19 ated with the wireless device corresponding to a move-
ment of the wireless device from a first cell to a second
cell; and analyzing the mobility history information to estimate
parameters related to the movement of the wireless
device.

F2. The method of clause F1, wherein the parameters
related to the movement of the wireless device include
a speed of the wireless device and a trajectory of the
wireless device.

F3. The method of any one or more of clauses F1-F2,
wherein the mobility history information associated
with the wireless device corresponding to the move-
ment of the wireless device is irrespective of a Radio
Resource Control (RRC) state of the wireless device.

F4. The method of clause F3, wherein the RRC state of
the wireless device includes one of: idle (denoted
RRC_IDLE), inactive (denoted RRC_INACTIVE), or
connected (denoted RRC_CONNECTED).

F5. The method of any one or more of clauses F1-F3,
wherein the mobility history information associated
with the wireless device corresponding to the move-
ment of the wireless device includes at least one of: an
absolute time of entering the second cell, a relative time
elapsed in the movement from the first cell to the
second cell, a location information of the wireless
device when entering the second cell, or a list of
location information of the wireless device in the
second cell measured at multiple time intervals.

F6. The method of clause F5, wherein the multiple time
intervals for measuring the list are configured by the
network node and sent to the wireless device, and
wherein a first entry in the list of location information
is measured at a time instant when the wireless device
is entering the second cell.

The full names of several acronyms used in this document
are provided below.

| Acronym | Full Name |
| --- | --- |
| 5G | Fifth Generation |
| 5GC | 5G Core network |
| AMF | Access Mobility Function |
| SMF | Session Management Function |
| UPF | User Plane Function |
| CN | Core Network |
| 5QI | 5G QoS Identifier |
| QoS | Quality of Service |
| EPC | Evolved Packet Core |
| LTE | Long Term Evolution |
| NR | New Radio |
| CU | Centralized Unit |
| DU | Distributed Unit |
| CP | Control Plane |
| UP | User Plane |
| BSR | Buffer Status Report |
| PHR | Power Headroom Report |
| SDAP | Service Data Adaptation Protocol |
| PDCP | Packet Data Convergence Protocol |
| RLC | Radio Link Control |
| MAC | Medium Access Control |
| PDU session | Protocol Data Unit session |
| DRB | Data Radio Bearer |
| SRB | Signaling Radio Bearer |
| GBR | Guaranteed Bit Rate |
| AMBR | Aggregated Maximum Bit Rate |
| RRM | Radio Resource Management |
| Uu | User-to-user |
| RNA | RAN Notification Area |
| RAN | Radio Access Network |
| MN | Master node |

20

-continued

| Acronym | Full Name |
| --- | --- |
| SN | Secondary node |
| PCell | Primary Cell |
| SCell | Secondary Cell |
| PSCell | Primary SCG Cell |
| MCG | Master Cell Group |
| SCG | Secondary Cell Group |
| OAM | Operation Administration and Maintenance |
| TCE | Trace Collection Entity |
| MDT | Minimization of Driving Test |
| SI | System Information |
| NGAP | Nex Generation Application Protocol |
| RA | Random Access |
| RACH | Random Access Channel |
| RRC | Radio Resource Control |
| DAPS | Dual Active Protocol Stack |

The disclosed and other embodiments, modules, and the
functional operations described in this document can be
implemented in digital electronic circuitry, or in computer
software, firmware, or hardware, including the structures
disclosed in this document and their structural equivalents,
or in combinations of one or more of them. The disclosed
and other embodiments can be implemented as one or more
computer program products, that is, one or more modules of
computer program instructions encoded on a computer-
readable medium for execution by, or to control the opera-
tion of, data processing apparatus. The computer-readable
medium can be a machine-readable storage device, a
machine-readable storage substrate, a memory device, a
composition of matter effecting a machine-readable propa-
gated signal, or a combination of one or more them. The
term "data processing apparatus" encompasses all apparatus,
devices, and machines for processing data, including by way
of example a programmable processor, a computer, or mul-
tiple processors or computers. The apparatus can include, in
addition to hardware, code that creates an execution envi-
ronment for the computer program in question, for example,
code that constitutes processor firmware, a protocol stack, a
database management system, an operating system, or a
combination of one or more of them. A propagated signal is
an artificially generated signal, for example, a machine-
generated electrical, optical, or electromagnetic signal, that
is generated to encode information for transmission to
suitable receiver apparatus.

A computer program (also known as a program, software,
software application, script, or code) can be written in any
form of programming language, including compiled or
interpreted languages, and it can be deployed in any form,
including as a stand-alone program or as a module, compo-
nent, subroutine, or other unit suitable for use in a computing
environment. A computer program does not necessarily
correspond to a file in a file system. A program can be stored
in a portion of a file that holds other programs or data (e.g.,
one or more scripts stored in a markup language document),
in a single file dedicated to the program in question, or in
multiple coordinated files (e.g., files that store one or more
modules, subprograms, or portions of code). A computer
program can be deployed to be executed on one computer or
on multiple computers that are located at one site or dis-
tributed across multiple sites and interconnected by a com-
munication network.

The processes and logic flows described in this document
can be performed by one or more programmable processors
executing one or more computer programs to perform func-
tions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, for example, magnetic, magneto-optical disks, or optical discs. However, a computer need not have such devices. Computer-readable media suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM discs. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements, and variations can be made based on what is described and illustrated in this patent document.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

We claim:

1. A method of wireless communication, comprising:

transmitting, by a network node, successful handover report configuration information to facilitate reporting of a successful handover report associated with a wireless device, wherein the successful handover report configuration information is included in a specified radio resource control (RRC) reconfiguration message; and receiving, by the network node, the successful handover report, wherein the successful handover report is included in a specified wireless device information response message.

2. The method of claim 1, further comprising:

receiving, by the network node, an indication that the wireless device has the successful handover report to transmit to the network node; and transmitting, by the network node, an information request message requesting the wireless device to send the successful handover report.

3. The method of claim 1, wherein the wireless device discards the successful handover report after sending, or after storing it for a specified time and the successful handover report is not fetched by the network node.

4. The method of claim 1, further comprising performing, by the network node, network optimization based on the successful handover report.

5. The method of claim 1, further comprising receiving, by the network node, an indication that the wireless device has a capability of supporting or sending the successful handover report.

6. A method of wireless communication, comprising:

receiving, by a wireless device, successful handover report configuration information to facilitate reporting of a successful handover report associated with the wireless device, wherein the successful handover report configuration information is included in a specified radio resource control (RRC) reconfiguration message; and sending, by the wireless device, the successful handover report, wherein the successful handover report is included in a specified wireless device information response message.

7. The method of claim 6, further comprising:

transmitting, by the wireless device, an indication that the wireless device has the successful handover report; and receiving, by wireless device, an information request message requesting the wireless device to send the successful handover report.

8. The method of claim 6, wherein the wireless device discards the successful handover report after sending, or after storing it for a specified time and the successful handover report is not fetched by a network node.

9. The method of claim 6, further comprising transmitting, by the wireless device, an indication that the wireless device has a capability of supporting or sending the successful handover report.

10. The method of claim 6, further comprising storing, by the wireless device, the successful handover report by overwriting a previous successful handover report with the successful handover report.

11. The method of claim 6, further comprising receiving, by the wireless device, conditional handover configuration information, wherein the successful handover report further comprises conditional handover related information that comprises at least one of: a list of candidate cells, a measurement result of a candidate cell at a first conditional handover execution, or a measurement result of a candidate cell at a second conditional handover execution.

12. The method of claim 6, wherein the successful handover report configuration information comprises at least one of: a reporting handover type, a threshold for a time elapsed from a conditional handover configuration reception to a handover execution, a threshold for an interruption time of a dual active protocol stack (DAPS) handover, a threshold for a number of random access (RA) attempts by the wireless device to complete a RA procedure, a threshold for a ratio of RA attempts with a lower reference signal received power (RSRP) to all RA attempts in a RA procedure, a threshold for a total time used for a RA procedure, a threshold for a ratio of contention-free random access (CFRA) attempts to a cumulative number of attempts when a CFRA resource is configured, an indication for a selected RA beam not having a highest RSRP, a threshold for a ratio of a running duration of a T312 timer from a start until the wireless device receives a handover command to a network-configured total time length of the T312 timer, or a threshold for a ratio of a running duration of a T310 timer from a start until the wireless device receives a handover command to a network-configured total time length of the T310 timer.

13. The method of claim 6, wherein the successful handover report comprises at least one of: an interruption time of a dual active protocol stack (DAPS) handover, information of a random access (RA) resource used for a handover procedure, information of a contention-free random access (CFRA) resource configured for a handover procedure, location information, a time elapsed from a conditional handover configuration reception to a handover execution, a reporting handover type, a number of RA attempts used for the wireless device to complete a RA procedure, a ratio of RA attempts with a lower reference signal received power (RSRP), a total time used for a RA procedure, a ratio of a number of CFRA attempts to a total number of attempts when a CFRA resource is configured, an indication for a selected RA beam not having a highest RSRP, a ratio of a running time length of a T312 timer until the wireless device receives a handover command compared to a configured total time length of the T312 timer, a ratio of a running time length of a T310 timer until the wireless device receives a handover command compared to a configured total time length of the T310 timer, an indication of whether a T312 timer is running, a configured total time length of a T312 timer, a configured total time length of a T310 timer, a running time length of a T312 timer until the wireless device receives a handover command, or a running time length of a T310 timer until the wireless device receives a handover command.

14. An apparatus for wireless communication comprising processor electronics and a memory storing instructions, execution of which by the processor electronics causes the apparatus to:

receive successful handover report configuration information to facilitate reporting of a successful handover report associated with the apparatus, wherein the successful handover report configuration information is included in a specified radio resource control (RRC) reconfiguration message; and send the successful handover report, wherein the successful handover report is included in a specified wireless device information response message.

15. The apparatus of claim 14, further caused to:

transmit an indication that the apparatus has the successful handover report; and receive an information request message requesting the apparatus to send the successful handover report.

16. The apparatus of claim 14, wherein the apparatus discards the successful handover report after sending, or after storing it for a specified time and the successful handover report is not fetched by a network node.

17. The apparatus of claim 14, further caused to transmit an indication that the apparatus has a capability of supporting or sending the successful handover report.

18. The apparatus of claim 14, further caused to store the successful handover report by overwriting a previous successful handover report with the successful handover report.

19. The apparatus of claim 14, further caused to receive conditional handover configuration information, wherein the successful handover report further comprises conditional handover related information that comprises at least one of: a list of candidate cells, a measurement result of a candidate cell at a first conditional handover execution, or a measurement result of a candidate cell at a second conditional handover execution.

* * * * *